May 5, 1953     E. F. KINGSLEY     2,637,822
ELECTRIC LOAD LIMITER
Filed July 29, 1950
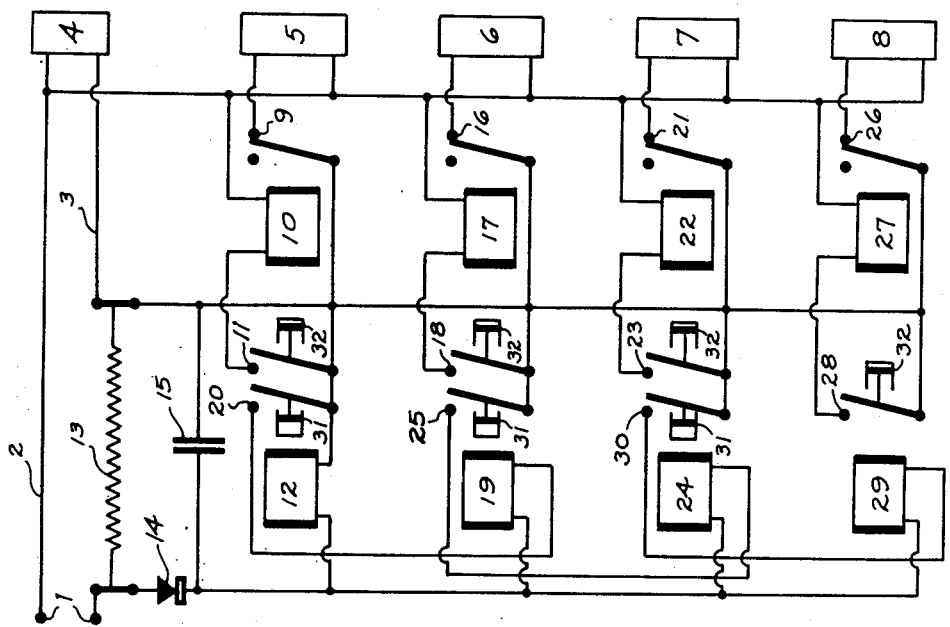
Fig. 2.
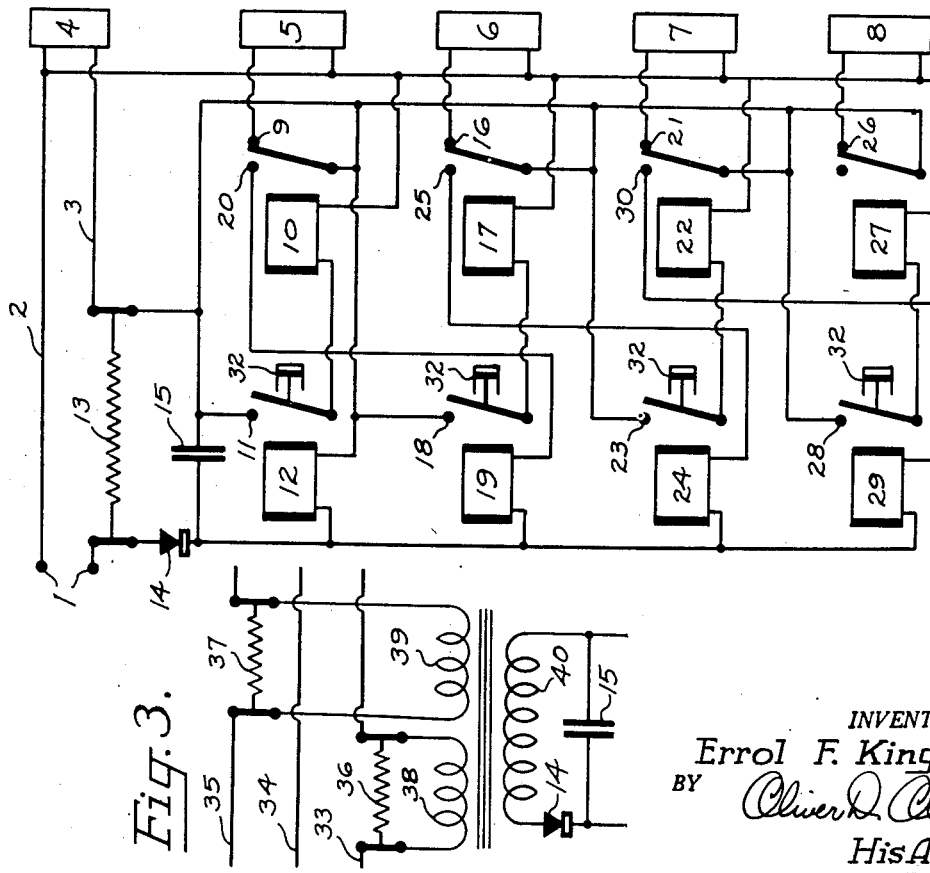
Fig. 1.
Fig. 3.
INVENTOR.
Errol F. Kingsley
BY Oliver D. Olson
His Agent Patented May 5, 1953

2,637,822

UNITED STATES PATENT OFFICE 2,637,822

ELECTRIC LOAD LIMITER

Errol F. Kingsley, Portland, Oreg., assignor to Iron Fireman Manufacturing Company, Portland, Oreg.

Application July 29, 1950, Serial No. 176,618

14 Claims. (Cl. 307—35)

This invention pertains to electric load limiters, and relates particularly to the novel construction of a device by which auxiliary loads are removed from an electrical circuit automatically and in sequence as the addition of primary loads reaches an established maximum capacity for the circuit.

It is a principal object of the present invention to provide an electric load limiter which accommodates ready adjustment to any desired maximum circuit capacity, whereby to afford with but one limiter device the accurate and positive control of circuits having diverse load characteristics.

Another important object of this invention is the provision of an electric load limiter which accommodates the control of each of a plurality of auxiliary loads by a sequence determined by the said auxiliary loads, whereby only selected auxiliary loads are removed as required.

A further object of this invention is the provision of an electric load limiter of simplified and economical construction and which is adaptable to circuits of various load characteristics merely by the selective exchange of a coupling element forming a part of the limiter device.

These and other objects and advantages of the present invention will appear from the following detailed description taken in connection with the accompanying drawing, in which:

Figure 1 is a diagrammatic view of an electric load limiter embodying the features of this invention and showing the same in operation in a circuit having a plurality of primary and secondary loads;

Figure 2 is a diagrammatic view similar to Figure 1 showing a modified form of electric load limiter embodying the features of the present invention; and Figure 3 is a diagrammatic view of a modified form of coupling means.

Stated broadly, the load limiter of this invention comprises a pair of cooperating relay coils for each auxiliary load, one of which coils is arranged in parallel with a coupling element disposed in series in the main circuit.

Referring to the drawing, the main power is supplied by source 1 through the distributing lines 2 and 3 to the primary loads indicated collectively at 4. By primary loads is meant those electrical devices which are considered important to maintain in continuous operation. In a factory these loads may comprise the essential operating equipment, the lighting system and other devices the functioning of which is important to constant production. In the home these primary loads may comprise the lighting system, the refrigerator, stove and other devices whose availability for immediate and uninterrupted service are considered important.

A plurality of auxiliary loads 5, 6, 7 and 8 are shown in the drawing to be arranged in parallel with each other and with the primary load 4. In a factory, for example, auxiliary loads may comprise those devices whose functions do not contribute essentially to the continued operation of the plant. In the home, auxiliary loads may comprise electric space heating elements, the water heater and other devices whose services may be discontinued temporarily when necessary.

In the circuit of auxiliary load 5 is a switch shown as comprising a pair of normally closed contacts 9. The movement of these contacts between the closed and open positions is controlled by the energization and deactivation, respectively, of relay coil 10. One end of coil 10 is connected to the main line 2, while the opposite end thereof is connected through the normally open contacts 11 to main line 3. The operation of contacts 11 is controlled by relay coil 12.

Relay coil 12 is connected at one end to line 3 at one end of the coupling resistor 13 disposed in series in the said line. The opposite end of coil 12 is connected through rectifier 14 to the opposite end of resistor 13. The resistor is preferably arranged for detachable connection in line 3 in such manner that its removal will break the electrical circuit to the coil 12. Condenser 15 is placed in shunt with coil 12 at the output of rectifier 14 to smooth out the rectified current, in manner well-known in the art.

Referring to the drawing, it is apparent that each auxiliary load is provided with a control system as described with reference to load 5. Thus, load 6 is connected to the lines 2, 3 through contacts which are actuated by the system comprising relay coil 17, contacts 18 and relay coil 19. The activation of coil 19 is controlled by contacts 20, as explained in detail hereinafter. In similar manner, load 7 is controlled by contacts 21, relay coil 22, contacts 23, relay coil 24 and contacts 25, while load 8 is controlled by contacts 26, relay coil 27, contacts 28, relay coil 29 and contacts 30.

It is to be noted that the series combinations of relay coils 10, 17, 22 and 27 and the respective contacts 11, 18, 23 and 28 are arranged in parallel with each other and connected to the lines 2, 3, as previously mentioned. It will be apparent from the following discussion that these coils 10, 17, 22 and 27 may be operated from a source of potential other than the source 1.

It is to be noted further that the series combinations of relay coils 19, 24 and 29 and the respective contacts 20, 25 and 30 are arranged in parallel with each other and with relay coil 12, across the resistor 13.

In the embodiment illustrated in Figure 1 of the drawing, contacts 20, 25 and 30 are actuated by relay coils 10, 17 and 22, respectively. Thus, when coil 12 is energized by virtue of an excessive load current being impressed across resistor 13, contacts 11 are closed to energize coil 10, whereupon contacts 9 are drawn open to remove the auxiliary load 5 from the main circuit and contacts 20 are drawn closed to complete the circuit to relay coil 19. It is to be observed, however, that contacts 9 move only a short distance to effect breaking the circuit to load 5 as compared to the longer distance of travel of contacts 20 in completing the circuit to coil 19. Thus, load 5 is removed before coil 19 is energized and, in the event that removal of load 5 is sufficient to reduce the total load current across resistor 13 below the established maximum, current is not available to energize coil 19 sufficiently to close contacts 18. In this manner, successive auxiliary loads are not caused to be removed for the instant which would otherwise occur if the foregoing delay were not provided.

In the modification shown in Figure 2, contacts 20, 25 and 30 are actuated by relay coils 12, 19 and 24, respectively. In this arrangement the energization of coil 12 upon the occasion of an over-load on the main circuit effects the closing of contacts 11 and 20. In order to avoid substantially simultaneous energization of coils 10 and 12, and therefore simultaneous energization of the succeeding similar pairs of coils, it is desirable to delay the closing of contacts 20, 25 and 30 until their complementary contacts 11, 16 and 23 have closed. In this manner the relay coils 10, 17 and 22 may operate to open their respective contacts 9, 16 and 21 and remove the loads 5, 6 and 7 in successive order before the coils 12, 19 and 24 become energized. Thus, for example, as coil 12 is energized contacts 11 close to energize coil 10 and open contacts 9. Load 5 is thereby removed from the main circuit before contacts 20 become closed. In the event, as explained hereinbefore, that removal of load 5 reduces the total current across resistor 13 below the established maximum, coil 19 will not become energized.

Various methods and means for delaying the closing and opening of electrical contacts are well-known to those skilled in the art. The mechanical dash pots shown schematically in the drawing are intended merely to illustrate the function of the delay. Since the type of delay mechanism does not form a part of the present invention, further description thereof is not presented.

The delay mechanism represented schematically in Figure 2 by the dash pots 31 connecting the movable contact of each pair of contacts 20, 25 and 30 need only be of the type which accommodates delay in closing the contacts. This is apparent for the reason that when the total load current across resistor 13 drops below the established maximum, all of the coils 12, 19, 24 and 29 become deenergized regardless of the position of the contacts 20, 25 and 30. Delay in the closing of said contacts, however, permit their complementary contacts 11, 18 and 23, respectively, to close first and thereby remove an auxiliary load before possible activation of the next succeeding coil.

The delay mechanism represented schematically in Figures 1 and 2 by the dash pots 32 connecting the movable contact of each pair of contacts 11, 18, 23 and 28 is of the type which accommodates delay in opening the contacts, and preferably of the type in which the time delay is capable of being adjusted. The time interval of delay in opening the contacts thus may be decreased progressively from relay coil 29 through relay coils 24 and 19 to coil 12. In this manner, as explained in detail hereinafter, when said coils have been deenergized by reduction of the total load current sufficiently below the established maximum, contacts 28 will open first to deenergize coil 27 and restore load 8 to the circuit. Contacts 23 will then open to restore load 7 to the circuit, following which contacts 18 will open to restore load 6 to the circuit. Finally contacts 11 open and load 5 is restored to the circuit. This arrangement is particularly desirable in order to prevent a sudden restoration of all auxiliary loads to the circuit, as explained in detail hereinafter.

It will be apparent to those skilled in the art that the progressive time delays of dash pots 32 may be arranged with respect to the various auxiliary loads in any pattern desired. Thus, for example, it may be desired to restore the loads in the time sequence 5, 6, 7, 8, or 6, 8, 7, 5, or in any other predetermined order. This merely requires the judicious selection of time delays.

For purposes of the following description of the operation of the present invention, let it be assumed that the value of resistor 13 is chosen to supply sufficient current to coils 12, 19, 24 and 29 to actuate the cooperating contacts when the power impressed on lines 2, 3 exceeds 10 kilowatts. Assume further that auxiliary loads 5, 6, 7 and 8 are on the lines and represent 2 kilowatts each, while the primary load 4 on the lines represents 2 kilowatts. The 10 kilowatts of power thus being used is insufficient to operate the relay coils.

Assume now that an additional primary load of 3 kilowatts is placed on the lines. The 13 kilowatts of power thus impressed causes activation of relay coil 12. Referring to Figure 1 of the drawing, the energization of coil 12 results in the closing of contacts 11 and the energization of coil 10. Contacts 9 open immediately to remove the 2 kilowatt load 5 from the lines, thereby reducing the total load to 11 kilowatts. Contacts 20 close to energize relay coil 19, whereupon contacts 18 close and coil 17 becomes activated. Contacts 16 are immediately opened to remove the 2 kilowatt load 6 from the lines and thus reduce the total load to 9 kilowatts. Contacts 25 also close, but the 9 kilowatts total load is insufficient to energize coil 24.

Let it be assumed further that coils 12, 19, 24 and 29 are of the well-known type in which deactivation occurs only when the current is reduced, for example, to a value below 80 per cent of the current required for energization. Thus, the coils are not deenergized until the total load on lines 2, 3 drops below 8 kilowatts. Since the removal of auxiliary loads 5 and 6 reduced the total load to 9 kilowatts, the system will remain at that load level for proper operation.

Assume now that an additional primary load of 4 kilowatts is placed on the lines, increasing the total to 13 kilowatts. Since contacts 25 have previously been closed, coil 24 now becomes energized. Contacts 23 are thus closed, coil 22 is energized and contacts 21 open to remove the 2 kilowatt auxiliary load 7 from the circuit and reduce the total load to 11 kilowatts. Contacts 30 close to energize coil 29 and close contacts 28, whereupon coil 27 is energized and contacts 26 open. Removal of the 2 kilowatt load 8 reduces the total load on lines 2, 3 to 9 kilowatts.

The operation of the system shown in Figure 2 in accordance with the foregoing example is substantially the same as in Figure 1 with the exception that the inherent time delay between the opening of contacts 9, 16 and 21 and the closing of contacts 20, 25 and 30, respectively, in Figure 1 is achieved in Figure 2 mechanically by the delay mechanisms 31 provided on contacts 20, 25 and 30.

Assume now that 4 kilowatts of primary load is removed from the circuit, reducing the total load to 5 kilowatts. Since the total load has been reduced below the value at which relay coils 12, 19, 24 and 29 become deenergized, their respective contacts 11, 18, 23 and 28 are free to open. In the event that the delay mechanism 32 is not employed, the said contacts open simultaneously to place auxiliary loads 5, 6, 7 and 8 in the circuit. The total load thus becomes 13 kilowatts, whereupon coils 12 and 13 become energized, in the foregoing manner, to remove loads 5 and 6 and reduce the total load to 9 kilowatts.

Alternatively, let it be assumed that the systems employ the delay devices 32, and that the time sequence of delay increases progressively from contacts 28 to contacts 11. Accordingly, contacts 28 open first and auxiliary load 8 is reinstated in the main circuit. The total load increases to 7 kilowatts. Contacts 23 open next to replace load 7 in the circuit and increase the total load to 9 kilowatts. Since contacts 11 and 18 are still closed, coils 19 and 12 are now affected by 9 kilowatts of load and, since they release only after the load is reduced to below 8 kilowatts, the contacts 18 and 11 do not open. Thus, the provision of progressive delay obviates the hunting for proper load level as is necessarily experienced in the systems having no means for delay.

It will be apparent to those skilled in the art that a transformer may be substituted for or employed in conjunction with the resistor 13 without departing from the scope and spirit of the present invention.

A further modification may be made for use in a three wire circuit wherein the total load is distributed between the said lines. Referring to Figure 3 of the drawing, there is shown the three supply lines 33, 34 and 35. In many instances the loads impressed, for example, across the lines 33 and 34 may be substantially different in magnitude from the load on lines 34 and 35. It is desirable to impress upon the relays 12, 19, 24 and 29 the effects of the total load operating in the circuit, and thereby obtain most efficient control. This may be accomplished in the manner illustrated in Figure 3, wherein resistors 36 and 37 are placed in series in lines 33 and 35, respectively. Transformer windings 38 and 39 are placed in shunt with the respective resistors 36 and 37, and coupled to the common winding 40. The latter is connected in shunt with the parallel relays 12, 19, 24 and 29, in the manner of resistor 13 as explained hereinbefore. The rectifier 14 and condenser 15 may be employed if desired. In the foregoing manner, the effects of the loads impressed across both resistors 36 and 37 is impressed upon transformer winding 40, whereby the parallel relays respond to the effects of the total load on the circuit.

It is apparent that the coils 38 and 39 may be used alone, i. e. without parallel combination with their respective resistors 36 and 37. Since, in any case, the function of the element selected is to couple the parallel coils 12, 19, 24 and 29 in series in the electrical circuit, it is defined generally in the appended claims as coupling means.

In the drawing and foregoing description the coils 12, 19, 24 and 29 are shown to be of the type operated by direct current. It is apparent that relay coils of the alternating current type may also be employed, in which case the rectifier 14 and condenser 15 may be eliminated. As stated hereinbefore, the coils 10, 17, 22 and 27 may be connected to a source of potential independent from source 1 because their operation is not dependent directly upon the characteristics of the load on lines 2, 3.

It is apparent further that any number of auxiliary loads may be controlled merely by providing additional relay coils and contacts for each load to be controlled, in the manner previously described. An auxiliary load may include a plurality of electrical elements operated on a single circuit, as is well-known in the art.

The foregoing and other modifications and changes may be made in the present invention without departing from the scope and spirit thereof. It is to be understood, therefore, that the foregoing description merely illustrates the features of the invention and is not intended as defining the limits thereof.

From the foregoing description it is apparent that the present invention provides versatile means for controlling the load impressed upon an electrical circuit. The provision of a removable coupling resistor, either alone or in combination with a transformer, affords utility of the device in circuits of different or variable load characteristics, thereby obviating the former necessity of providing a plurality of limiter devices each constructed to accommodate a specific circuit. The arrangement of a pair of relays for each auxiliary load circuit prevents arcing between the contact points of the normally closed switch in the circuit by virtue of the positive activation and deactivation of the cooperating relay by the operation of the normally open switch and second relay. The parallel arrangement of relay and switch units accommodates the control of any number of auxiliary loads and in any sequence of operation, thereby permitting arrangement of loads sequentially in the order of their relative importance. The load limiter is of simplified and, therefore, economical construction, the provision of a minimum of moving parts enhancing considerably the life and consistency of operation.

Having now described my invention and the manner in which the same may be used, what I claim as new and desire to secure by Letters Patent is:

1. In combination with an electrical circuit including an auxiliary load, normally closed switch means in the auxiliary load, relay means for actuating the normally closed switch means, normally open switch means in the circuit of the relay means, second relay means for actuating the normally open switch means, and coupling means connecting the second relay means in series in the said electrical circuit.

2. In combination with an electrical circuit including a plurality of auxiliary loads, normally closed switch means in each of the auxiliary load circuits, a plurality of relay means, each relay means actuating one of the normally closed switch means, normally open switch means in the circuit of each relay means, a plurality of second relay means each actuating one of the normally open switch means, second normally open switch means in the circuit of each of the second relay means succeeding the first in order, and coupling means connecting the second relay means in series in the said electrical circuit.

3. In combination with an electrical circuit including a plurality of auxiliary loads, normally closed switch means in each of the auxiliary load circuits, a plurality of relay means, each relay means actuating one of the normally closed switch means, normally open switch means in the circuit of each relay means, a plurality of second relay means connected in parallel, each actuating one of the normally open switch means, second normally open switch means in the circuit of each of the second relay means succeeding the first in order, and resistor coupling means connecting the parallel second relay means in series in the said electrical circuit.

4. In combination with an electrical circuit including a plurality of auxiliary loads, normally closed switch means in each of the auxiliary load circuits, a plurality of relay means connected in parallel to said electrical circuit, each relay means actuating one of the normally closed switch means, normally open switch means in the circuit of each relay means, a plurality of second relay means connected in parallel, each actuating one of the normally open switch means, second normally open switch means in the circuit of each of the second relay means succeeding the first in order, and coupling means connecting the parallel second relay means in series in the said electrical circuit.

5. In combination with an electrical circuit including a plurality of auxiliary loads, normally closed switch means in each of the auxiliary load circuits, a plurality of relay means, each relay means actuating one of the normally closed switch means, normally open switch means in the circuit of each relay means, a plurality of second relay means each actuating one of the normally open switch means, a normally closed switch means, a first relay means, a first normally open switch means and a second relay means comprising a unit, second normally open switch means in the circuit of each of the second relay means succeeding the first in order, each of the second switch means being actuated by one of the relay means of the next preceding unit, and coupling means connecting the second relay means in series in the said electrical circuit.

6. In combination with an electrical circuit including a plurality of auxiliary loads, normally closed switch means in each of the auxiliary load circuits, a plurality of relay means, each relay means actuating one of the normally closed switch means, normally open switch means in the circuit of each relay means, a plurality of second relay means each actuating one of the normally open switch means, a normally closed switch means, a first relay means, a first normally open switch means and a second relay means comprising a unit, second normally open switch means in the circuit of each of the second relay means succeeding the first in order, each of the second switch means being activated by the first relay means of the next preceding unit, and coupling means connecting the second relay means in series in the said electrical circuit.

7. In combination with an electrical circuit including a plurality of auxiliary loads, normally closed switch means in each of the auxiliary load circuits, a plurality of relay means, each relay means actuating one of the normally closed switch means, normally open switch means in the circuit of each relay means, a plurality of second relay means each actuating one of the normally open switch means, a normally closed switch means, a first relay means, a first normally open switch means and a second relay means comprising a unit, second normally open switch means in the circuit of each of the second relay means succeeding the first in order, each of the second switch means being actuated by the second relay means of the next preceding unit, and coupling means connecting the second relay means in series in the said electrical circuit.

8. In combination with an electrical circuit including a plurality of auxiliary loads, normally closed switch means in each of the auxiliary load circuits, a plurality of relay means, each relay means actuating one of the normally closed switch means, normally open switch means in the circuit of each relay means, a plurality of second relay means each actuating one of the normally open switch means, a normally closed switch means, a first relay means, a first normally open switch means and a second relay means comprising a unit, second normally open switch means in the circuit of each of the second relay means succeeding the first in order, coupling means connecting the second relay means in series in the said electrical circuit, and delay means on the first normally open switch means of each unit for controlling the sequence of opening of said switch means.

9. In combination with an electrical circuit including a plurality of auxiliary loads, normally closed switch means in each of the auxiliary load circuits, a plurality of relay means, each relay means actuating one of the normally closed switch means, normally open switch means in the circuit of each relay means, a plurality of second relay means each actuating one of the normally open switch means, a normally closed switch means, a first relay means, a first normally open switch means and a second relay means comprising a unit, second normally open switch means in the circuit of each of the second relay means succeeding the first in order, coupling means connecting the second relay means in series in the said electrical circuit, and delay means on the second normally open switch means for delaying the closing thereof relative to the closing of the first normally open switch means of the next preceding unit.

10. In combination with an electrical circuit including a plurality of auxiliary loads, normally closed switch means in each of the auxiliary load circuits, a plurality of relay means, each relay means actuating one of the normally closed switch means, normally open switch means in the circuit of each relay means, a plurality of second relay means each actuating one of the normally open switch means, a normally closed switch means, a first relay means, a first normally open switch means and a second relay means comprising a unit, second normally open switch means in the circuit of each of the second relay means succeeding the first in order, coupling means connecting the second relay means in series in the said electrical circuit, delay means on the second normally open switch means for delaying the closing thereof relative to the closing of the first normally open switch means of the next preceding unit, and delay means on the first normally open switch means of each unit for controlling the sequence of opening of said switch means.

11. In combination with an electrical circuit including a plurality of auxiliary loads, normally closed switch means in each of the auxiliary load circuits, a plurality of relay means, each relay means actuating one of the normally closed switch means, normally open switch means in the circuit of each relay means, a plurality of second relay means each actuating one of the normally open switch means, a normally closed switch means, a first relay means, a first normally open switch means and a second relay means comprising a unit, second normally open switch means in the circuit of each of the second relay means succeeding the first in order, each of the second switch means being actuated by the first relay means of the next preceding unit, coupling means connecting the second relay means in series in the said electrical circuit, and delay means on the first normally open switch means of each unit for controlling the sequence of opening of said switch means.

12. In combination with an electrical circuit including a plurality of auxiliary loads, normally closed switch means in each of the auxiliary load circuits, a plurality of relay means, each relay means actuating one of the normally closed switch means, normally open switch means in the circuit of each relay means, a plurality of second relay means each actuating one of the normally open switch means, a normally closed switch means, a first relay means, a first normally open switch means and a second relay means comprising a unit, second normally open switch means in the circuit of each of the second relay means succeeding the first in order, each of the second switch means being actuated by the second relay means of the next preceding unit, coupling means connecting the second relay means in series in the said electrical circuit, and delay means on the second normally open switch means for delaying the closing thereof relative to the closing of the first normally open switch means of the next preceding unit.

13. In combination with an electrical circuit including a plurality of auxiliary loads, normally closed switch means in each of the auxiliary load circuits, a plurality of relay means, each relay means actuating one of the normally closed switch means, normally open switch means in the circuit of each relay means, a plurality of second relay means each actuating one of the normally open switch means, a normally closed switch means, a first relay means, a first normally open switch means and a second relay means comprising a unit, second normally open switch means in the circuit of each of the second relay means succeeding the first in order, each of the second switch means being actuated by the second means of the next preceding unit, coupling means connecting the second relay means in series in the said electrical circuit, delay means on the second normally open switch means for delaying the closing thereof relative to the closing of the first normally open switch means of the next preceding unit, and delay means on the first normally open switch means of each unit for controlling the sequence of opening of said switch means.

14. In combination with an electrical circuit including a plurality of auxiliary loads, normally closed switch means in each of the auxiliary load circuits, a plurality of relay means, each relay means actuating one of the normally closed switch means, normally open switch means in the circuit of each relay means, a plurality of second relay means each actuating one of the normally open switch means, second switch means in the circuit of each of the second relay means succeeding the first in order and actuated by one of the relays controlling the next preceding auxiliary load, and coupling means connecting the second relay means in series in the said electrical circuit.

ERROL F. KINGSLEY.

References Cited in the file of this patent

UNITED STATES PATENTS

| Number | Name | Date |
| --- | --- | --- |
| 1,194,165 | Fry | Aug. 8, 1916 |
| 2,480,452 | Dole | Aug. 30, 1949 |